(12) United States Patent
Bonanni et al.

(10) Patent No.: US 7,003,426 B2
(45) Date of Patent: Feb. 21, 2006

(54) METHOD AND SYSTEM FOR DETECTING PRECURSORS TO COMPRESSOR STALL AND SURGE

(75) Inventors: Pierino Bonanni, Clifton Park, NY (US); Narayanan Venkateswaran, New Thippasandra (IN); Sanjay Bharadwaj, Koramangala (IN)

(73) Assignee: General Electric Company, Niskayuna, NY (US)

( * ) Notice: Subject to any disclaimer, the term of this patent is extended or adjusted under 35 U.S.C. 154(b) by 38 days.

(21) Appl. No.: 10/065,331

(22) Filed: Oct. 4, 2002

(65) Prior Publication Data

US 2004/0068387 A1  Apr. 8, 2004

(51) Int. Cl.
  *G01L 7/00* (2006.01)
  *G06F 19/00* (2006.01)
  *G01N 29/00* (2006.01)

(52) U.S. Cl. .................... 702/138; 73/660; 415/1; 416/26; 701/100; 702/182

(58) Field of Classification Search .............. 702/35, 702/81, 98, 127, 182, 190; 700/174–178, 700/301; 701/100; 415/1, 55.7; 416/26; 60/39.3, 772, 773; 73/593, 602, 659, 660
See application file for complete search history.

(56) References Cited

U.S. PATENT DOCUMENTS

| 5,448,881 | A  | * | 9/1995 | Patterson et al. ............. 60/794 |
| 5,894,473 | A  | * | 4/1999 | Dent ......................... 370/342 |
| 6,438,484 | B1 | * | 8/2002 | Andrew et al. ............. 701/100 |
| 6,506,010 | B1 |   | 1/2003 | Yeung et al. .................. 415/1 |
| 6,522,991 | B1 | * | 2/2003 | Banaszuk et al. ........... 702/138 |
| 6,532,433 | B1 | * | 3/2003 | Bharadwaj et al. ......... 702/182 |
| 6,536,284 | B1 | * | 3/2003 | Bonanni ..................... 73/660 |

FOREIGN PATENT DOCUMENTS

| EP | 0315307 | 5/1989 | ................. 702/185 |
| EP | 0516534 | 12/1992 | |

OTHER PUBLICATIONS

Orme et al., "Flight Assessment of the Onboard Propulsion System Model for the Performance Seeking Control Algorithm on an F-15 Aircraft", NASA, Jul. 1995.*
EP Search Report, EP03256261, J. Teerling, Jan. 19, 2005.

* cited by examiner

*Primary Examiner*—Michael Nghiem
*Assistant Examiner*—John Le
(74) *Attorney, Agent, or Firm*—Penny A. Clarke; Patrick K. Pathode

(57) ABSTRACT

A method and system for detecting precursors to compressor stall and surge in which at least one compressor parameter is monitored to obtain raw data representative of said at least one compressor parameter. The raw data is pre-processed using a frequency demodulator to produce pre-processed data, and the pre-processed raw data is post-processed using a Kalman filter to obtain stall precursors.

28 Claims, 6 Drawing Sheets

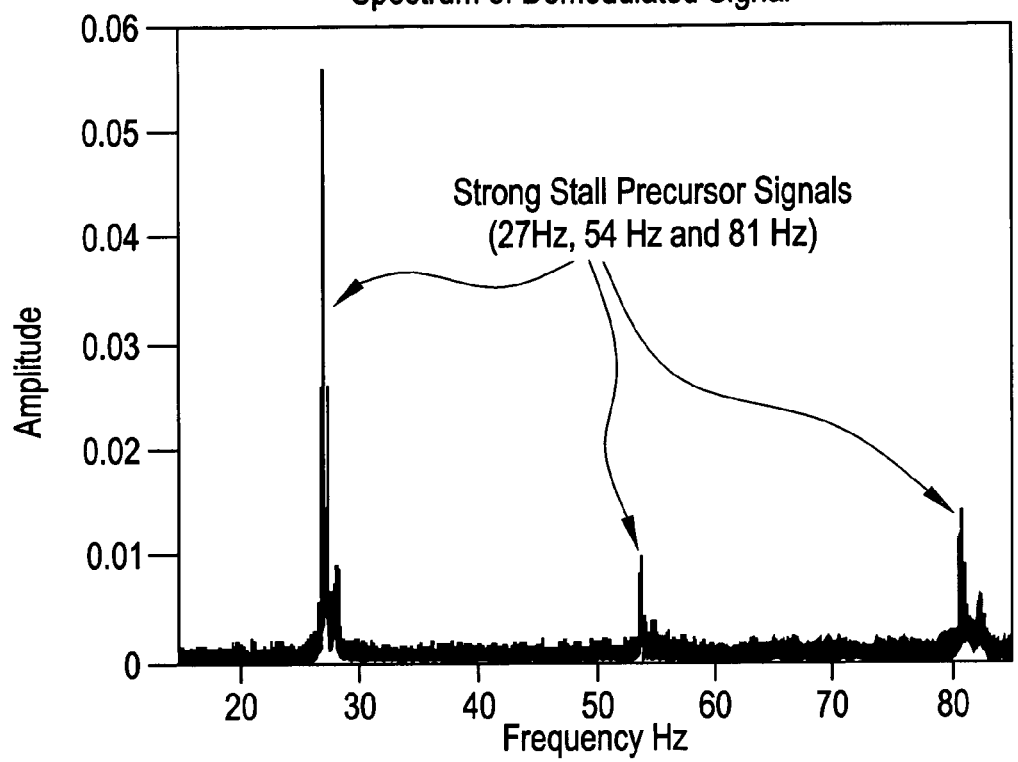
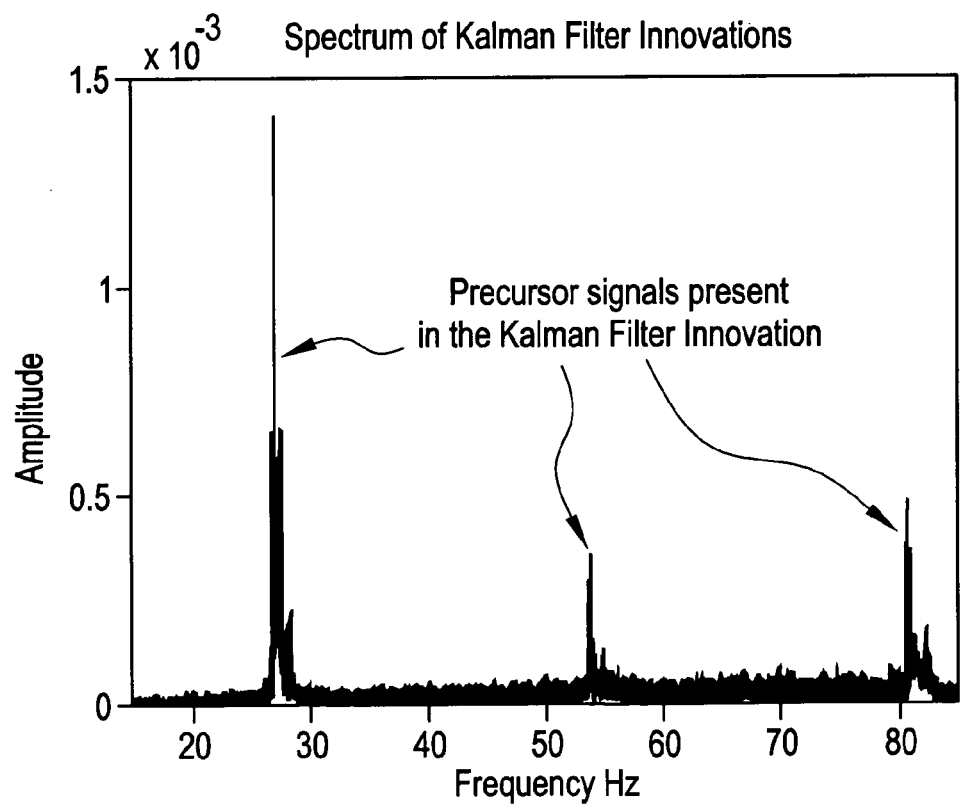

METHOD AND SYSTEM FOR DETECTING PRECURSORS TO COMPRESSOR STALL AND SURGE

BACKGROUND OF INVENTION

The global market for efficient power generation equipment has been expanding at a rapid rate since the mid-1980's. This trend is projected to continue in the future. The gas turbine combined cycle power plant, usually comprising a gas turbine based topping cycle and a Rankine based bottoming cycle, continues to be the preferred choice in power generation. This may be due to the relatively low plant investment cost as well as the continuously improving operating efficiency of the gas turbine based combined cycle.

During operation of a gas turbine, there may occur a phenomenon known as compressor stall, wherein the pressure ratio of the compressor initially exceeds some critical value at a given speed, resulting in a subsequent reduction of compressor pressure ratio and airflow delivered to the combustor. Compressor stall may result from a variety of conditions, such as rapid acceleration of the engine, or undue distortion of the inlet profile of air pressure or temperature during normal operation of the engine. Compressor damage due to the ingestion of foreign objects or a malfunction of a portion of the engine control system may also result in a compressor stall and subsequent compressor degradation. If compressor stall remains undetected and permitted to continue, the combustor temperatures and the vibratory stresses induced in the compressor may become sufficiently high to cause damage to the gas turbine.

Elevated firing temperatures enable increases in combined cycle efficiency and specific power. Furthermore, for a given firing temperature, an optimal cycle pressure ratio may be identified which maximizes combined-cycle efficiency. This optimal cycle pressure ratio has been theoretically shown to increase with increasing firing temperature. Axial flow compressors, which are at the heart of industrial gas turbines, are thus subjected to demands for ever-increasing pressure ratios, with the simultaneous goals of minimal parts count, operational simplicity, and low overall cost. Furthermore, an axial flow compressor is expected to operate at a heightened level of cycle pressure ratio at a compression efficiency that augments the overall cycle efficiency. An axial flow compressor is also expected to perform in an aerodynamically and aero-mechanically stable manner over a wide range in mass flow rate associated with the varying power output characteristics of the combined cycle operation.

The operating compressor pressure ratio of an installed gas turbine engine is typically set at a pre-specified margin away from the surge/stall boundary, generally referred to as surge margin or stall margin, to avoid unstable compressor operation. Uprates on installed base and new products that leverage proven technologies by adhering to existing compressor footprints often require a reduction in the operating surge/stall margin to allow higher pressure ratios. At the heart of these uprates and new products is not only the ability to assess surge/stall margin requirements and corresponding risks of surge, but also the availability of tools to continuously predict and monitor the health of the compressors in field operations.

One approach monitors the health of a compressor by measuring the air flow and pressure rise through the compressor. A range of values for the pressure rise is selected a-priori, beyond which the compressor operation is deemed unhealthy and the machine is shut down. Such pressure variations may be attributed to a number of causes such as, for example, unstable combustion, or rotating stall and surge events on the compressor itself. To detect these events, the magnitude and rate of change of pressure rise through the compressor are monitored. When such an event occurs, the magnitude of the pressure rise may drop sharply, and an algorithm monitoring the magnitude and its rate of change may acknowledge the event. This approach, however, does not offer prediction capabilities of rotating stall or surge, and fails to offer information to a real-time control system with sufficient lead time to proactively deal with such events.

SUMMARY OF INVENTION

The above drawbacks and deficiencies of the prior art are overcome or alleviated by a method and system for detecting precursors to compressor stall/surge wherein at least one compressor parameter is monitored to obtain raw data representative thereof. The raw data is pre-processed using a frequency demodulator to produce pre-processed data, and the pre-processed data is post-processed using a Kalman filter to obtain stall precursors.

These and other features and advantages of the invention will be understood from the following description and drawings.

BRIEF DESCRIPTION OF DRAWINGS

FIG. 6 shows a spectrum of raw data of FIG. 4 after being demodulated;

FIG. 7 shows a spectrum of Kalman filter innovations during processing of the raw data of FIG. 4.

DETAILED DESCRIPTION

Figure 3:
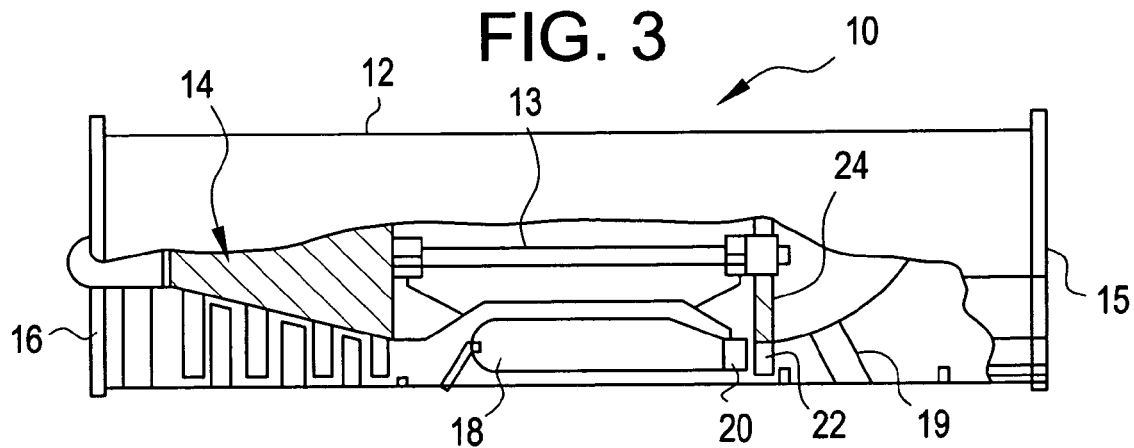
FIG. 3 shows an exemplary gas turbine engine.

FIG. 3 shows a gas turbine engine 10 that comprises a cylindrical housing 12 having an axial flow compressor 14 within housing 12 adjacent to its forward end. Compressor 14 has an outer casing that receives air through an annular air inlet 16 and delivers compressed air to combustion chamber 18. Within combustion chamber 18, air is burned with fuel and the resulting combustion gases are directed by a nozzle or guide vane structure 20 to the rotor blades 22 of a turbine rotor 24 for driving the rotor. A shaft 13 drivably connects the turbine rotor 24 with the compressor 14. From the turbine blades 22, the exhaust gases discharge rearward through an exhaust duct 19 into the surrounding atmosphere, a bottoming cycle such as the superheater/boiler of a Rankine cycle plant (not shown), or other point of use.

During operation of turbine engine 10, there may occur a phenomenon known as compressor stall, wherein the pressure ratio of compressor 14 initially exceeds some critical value at a given speed, resulting in a subsequent reduction of compressor pressure ratio and airflow delivered to the combustor. Compressor stall may result from a variety of conditions, such rapid engine acceleration or undue distortion of the inlet profile of air pressure or temperature during normal operation of the engine. Compressor damage due to the ingestion of foreign objects or a malfunction of a portion of the engine control system may also result in a compressor stall and subsequent compressor degradation. If compressor stall remains undetected and permitted to continue, the combustor temperatures and the vibratory stresses induced in the compressor may become sufficiently high to cause damage to the gas turbine.

Figure 1:
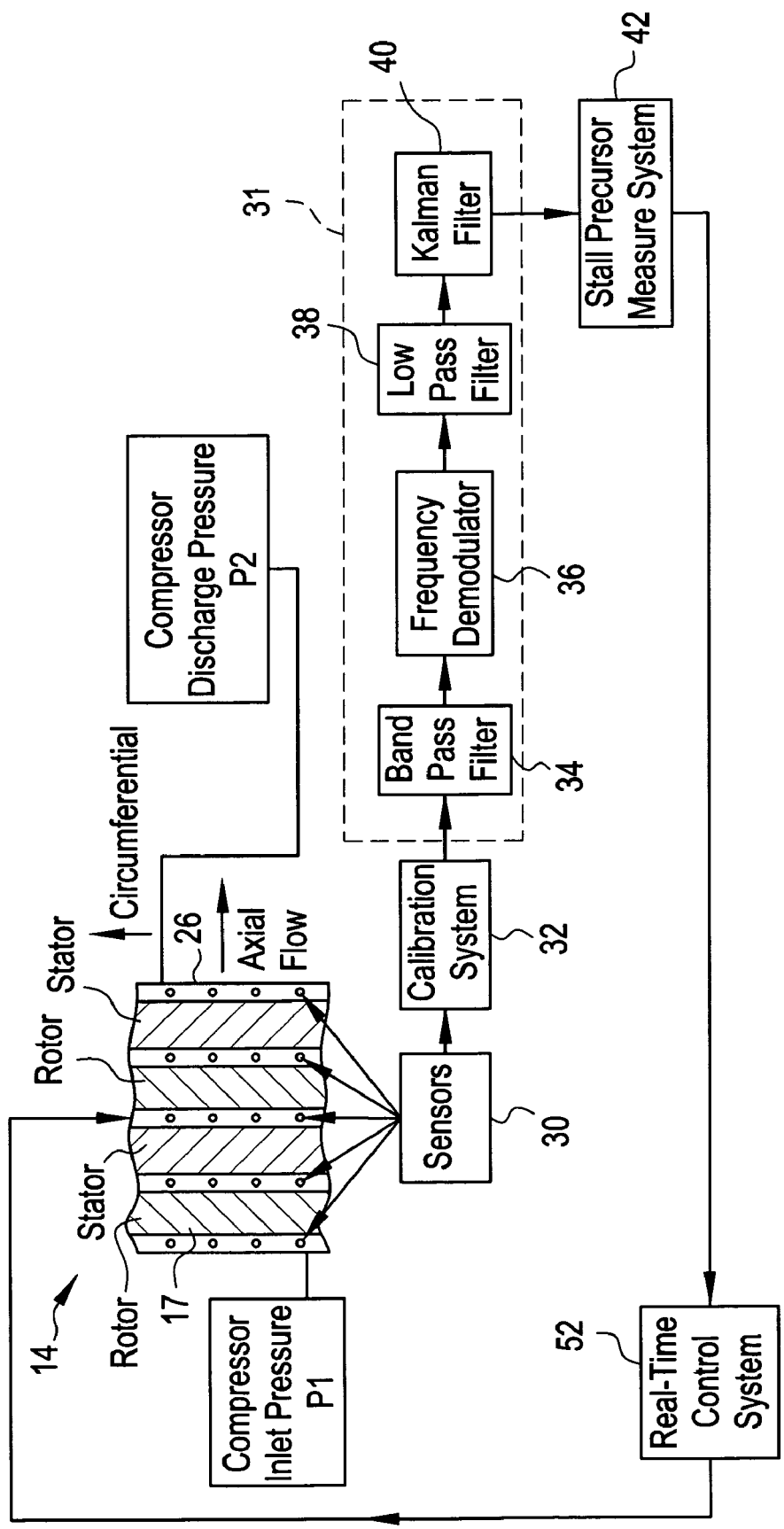
FIG. 1 shows a block diagram representing an apparatus and method for monitoring and controlling a compressor according to a first embodiment.

FIG. 1 shows in block diagram fashion an apparatus and method for monitoring and controlling compressor 14. The apparatus and method can be implemented for a compressor having any number of stages. In the first exemplary embodiment, one or more sensors 30 are disposed about casing 26 for monitoring compressor parameters such as, for example, pressure and velocity of gases flowing through the compressor and/or force and vibrations exerted on compressor casing 26. Dynamic pressure of gases flowing through the compressor is used as an exemplary parameter in the detailed description as set forth below. It will be appreciated that instead of pressure, other compressor parameters may be monitored to infer the health of compressor 14. The dynamic pressure data collected by sensor(s) 30 is fed to a calibration system 32 for processing and storage.

The calibration system includes an A/D converter for sampling and digitizing the time-series data for processing by processor 31. Processor 31 performs the functions of filtering the collected pressure data to remove noise and of time-series analyzing the data. Upon receipt of the data from calibration system 32, band-pass filter 34 rejects frequencies outside a band of pre-specified width, the pre-specified width being centered on a particular frequency ($f_c$) of interest. The tip passage frequency of the blades 17 of compressor 14 may be used as an example frequency of interest. The tip passage frequency is the product of the number of compressor blades 17 and the rotational rate of the rotor.

When the amount of stored data received from sensor(s) 30 reaches a predetermined level, frequency demodulator 36 processes data from band-pass filter 34 and extracts frequency demodulated signals. More particularly, frequency demodulator 36 produces an output signal whose amplitude corresponds, as noted above, to the instantaneous frequency of a locally dominant component in the input signal. Also, the center frequency of the frequency demodulation system 36 is selected, for example, to be the tip passage frequency of rotating blades 17 of compressor 14. For example, if the center frequency of the frequency demodulation system 36 is set at a frequency $f_c$, then the output of the frequency demodulation system 36 is zero whenever the instantaneous frequency of the input to this demodulation system is equal to $f_c$. Frequency demodulated signals are smoothed using a low-pass filter 38 to reduce the influence of noise.

Upon collecting, digitizing, and processing the sensor data to get the locally dominant component for a pre-specified amount of data, a time-series analysis is performed on the locally dominant component data to obtain the dynamic model parameters that are used in Kalman filter 40 post-processing.

As is understood in the art, Kalman filter 40 contains a dynamic model of system states, characterized as a set of first order linear differential equations and a measurement model containing the relationship between the states and the output of the system. Kalman filter 40 in the present system combines the dynamic model parameters with newly monitored locally dominant component, i.e., the sensor data, passed through band-pass filter 34, frequency demodulation system 36 and low-pass filter 38. Kalman filter 40 then computes a filtered estimate of the chosen states. Kalman filter 40 updates, using a set of weighting factors, its filtered estimate of a subsequent data sample based upon the most recent locally dominant processed data sample. The weighting factors are applied to take account of the relative contribution of error sources in the system as well as in the measurements. These weighting factors are optimized at values depending on the calculated simultaneous minimum variance in the distribution of errors. Stall precursor measurement system 42 compares the difference between the monitored data and the filtered estimate, known as the "innovations", and computes a standard deviation of innovations upon making a predetermined number of comparisons. The magnitude of the standard deviation of the Kalman filter innovations represents the stall precursor signals.

Real-time control system 52 inputs stall precursor signals from stall precursor measurement system 42, along with other feedback and control parameters (not shown) for controlling compressor 14. In the instance where stall precursor signals indicate, by virtue of their magnitude, that the compressor is in danger of stalling, real-time control system 52 is able to take corrective action thereby preventing any such stall from occurring.

Figure 2:
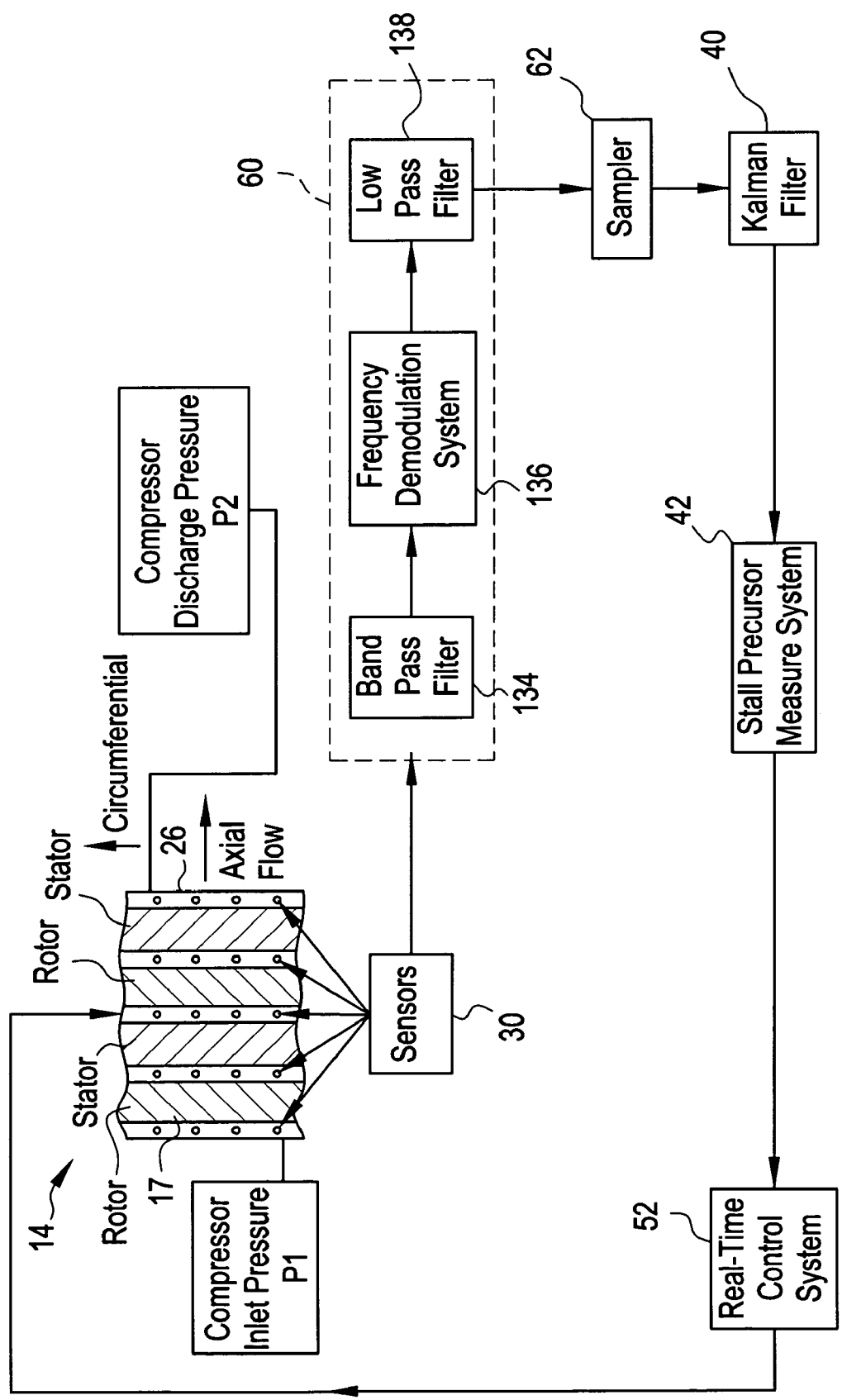
FIG. 2 shows a block diagram representing an apparatus and method for monitoring and controlling a compressor according to a second embodiment.

FIG. 2 shows a second embodiment where elements in common with the system of FIG. 1 are indicated by similar reference numerals. Here, compressor parameters measured by sensors 30 are passed directly to analog system 60 which implements at least one or more of the band-pass filter 134, frequency demodulation system 136, and low-pass filter 138. The analog signals are passed through to sampler 62 wherein the analog signals are digitized and processed to obtain the measurements for the post-processing Kalman filter, which in turn will provide the stall precursors. Post processing by Kalman filter 40 proceeds as discussed above with respect to the embodiment shown in FIG. 1. The arrangement of FIG. 4 significantly reduces the sampling rate of the data acquisition process. The sampling rate benefit is realized if both the band-pass filter and frequency demodulator algorithm are realized using analog circuitry.

The method implemented by the exemplary systems discussed above includes monitoring at least one compressor parameter, analyzing the monitored parameter to obtain time-series data, pre-processing the time-series data using a frequency demodulator to produce output signals, and post-processing the output signals using a Kalman filter to determine stall precursors. Stall precursors are then compared with predetermined baseline values to identify compressor degradation and corrective actions are taken to mitigate compressor degradation to maintain a pre-selected level of compressor operability. The corrective actions are preferably performed iteratively until the monitored compressor parameter lies within the predetermined threshold.

In one embodiment, pre-processing the raw data includes filtering the time-series analyzed data to reject undesirable signals, frequency demodulating the filtered signal to produce an output signal with an amplitude corresponding to the instantaneous frequency of a locally dominant component of the input signal, and low pass filtering the frequency demodulated signal to reduce noise interference. The low-pass filtered signal is processed to compute the dynamic model parameters which are combined in the Kalman filter to produce a filtered estimate. The standard deviation of the filtered estimate and the new measurement are computed to produce stall precursors.

In one embodiment, filtering the time-series analyzed data to reject undesirable signals is performed using a band-pass filter or algorithm. The center frequency ($f_c$) of the band-pass filter is preferably set to the tip passage frequency of the compressor blades. The step of frequency demodulating the filtered signal may preferably be performed by a frequency demodulator in which the center, or reference, frequency $f_c$ is set to the tip passage frequency of the compressor blades.

Preprocessing may be performed in the digital domain or the analog domain. If it is performed in the digital domain, sensor signals are sampled, digitized and calibrated prior to being filtered or demodulated using a digital system. If the preprocessing is performed in the analog domain, the analog signals are subjected to one or more functions including band-pass filtered, demodulated, and low-pass filtered prior to being sampled and digitized.

Corrective actions are preferably initiated by varying operating line parameters and include reducing the loading on the compressor. The operating line parameters are preferably set to a near threshold value.

Figure 4:
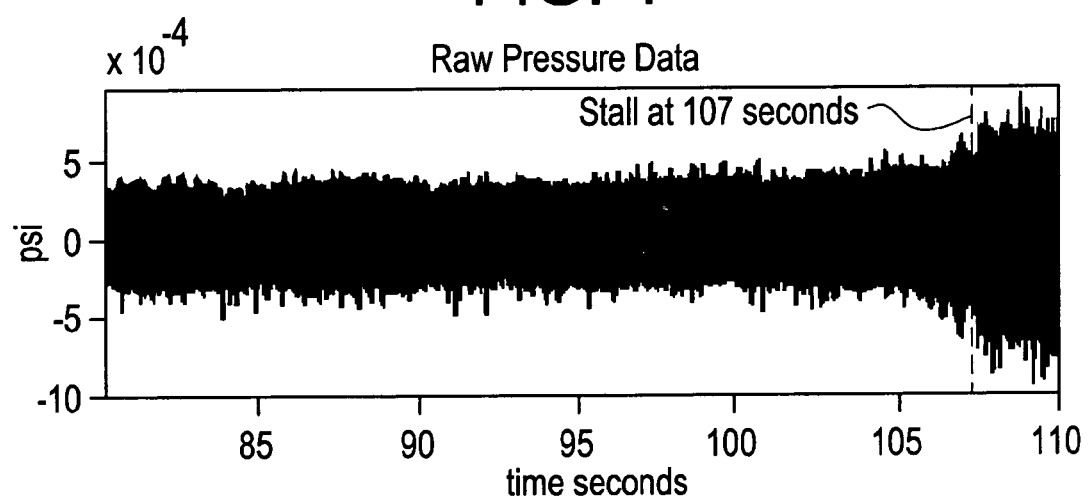
FIG. 4 shows raw sensor data for illustration purposes.

For purposes of illustration, FIG. 4 shows exemplary raw pressure data sensed from a pressure sensor located as discussed above with respect to FIG. 1. In the exemplary data shown, a stall occurs at about 107 seconds.

Figure 5:
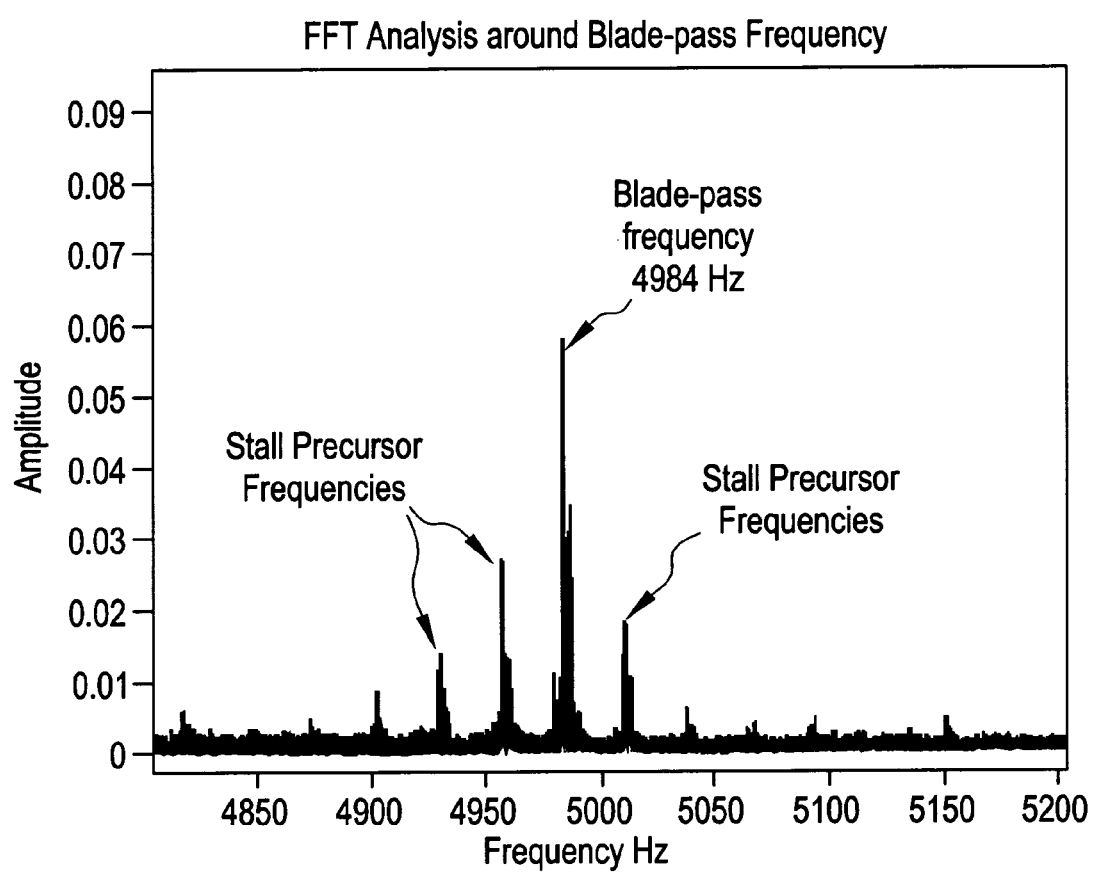
FIG. 5 shows a frequency spectrum analysis of the raw data of FIG. 4.

FIG. 5 shows frequency spectrum analysis of the raw pressure data of FIG. 4 prior to the stall event. At this time, the machine was operating around 95% corrected speed (4984 Hz tip passage frequency). The precursor signals are shown at 27 and 54 Hz about the central tip passage frequency of 4984 Hz. The frequency demodulator captured these frequencies and the demodulated signal was used for post-processing by the Kalman filter.

FIG. 6 shows the capturing of the precursor spectrum by the demodulator. In this case, the precursor frequencies include 27, 54, and 81 Hz.

FIG. 7 shows the presence of the precursor frequencies in the Kalman filter innovations. It is the capturing of these signals in the innovations of the Kalman filter that helps in the detection process. As the machine approaches the operating limit line, the magnitude of these signals increase and the Kalman filter innovation captures this phenomena leading ultimately to the detection and declaration of stall/surge.

Figure 8:
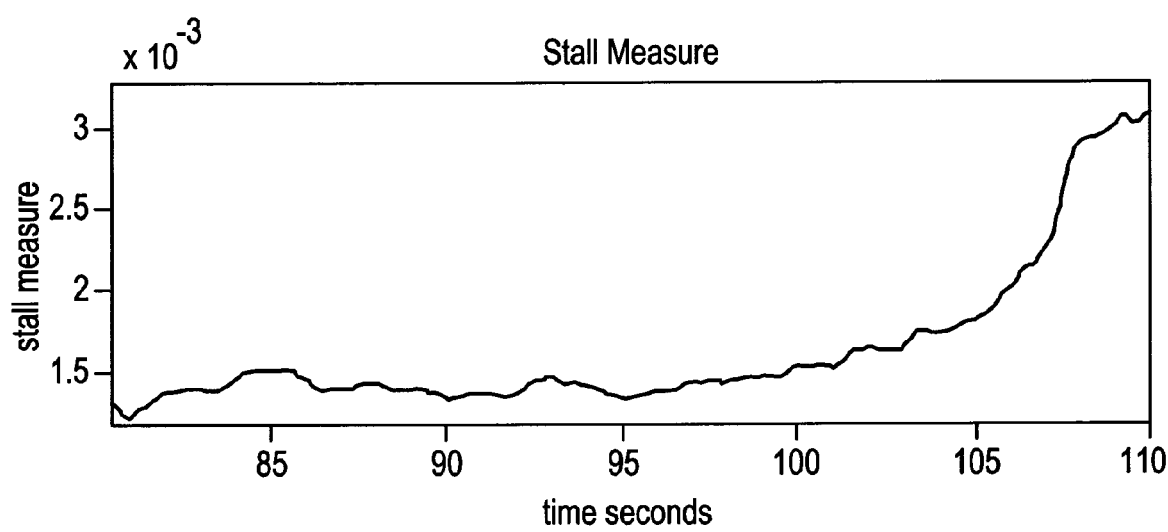
FIG. 8 shows a stall measure obtained after post-processing by the Kalman filter of the raw data of FIG. 4.

FIG. 8 shows the stall measure obtained after post processing by the Kalman filter. The stall measure shows a precursor trend well ahead of the actual stall event at 107 seconds, starting as early as 80–85 seconds. Scaling and thresholding of the stall measure is done to declare the presence of strong precursors so as to enable intervention by the control system, thereby preventing the stall/surge event from occurring.

The present invention solves the problem of simultaneous need for high pressure ratios commensurate with high efficiency.

While the invention has been described in connection with what is presently considered to be the most practical and preferred embodiment, it will be understood that the invention is not to be limited to the disclosed embodiment, but on the contrary, is intended to cover various modifications and equivalent arrangements included within the spirit and scope of the appended claims.

What is claimed is:

1. A method for detecting precursors to compressor stall/surge, the method comprising:
    monitoring at least one compressor parameter to obtain raw data representative of said at least one compressor parameter;
    pre-processing said raw data using a frequency demodulator to produce pre-processed data comprising at least one demodulated signal having an amplitude corresponding to the instantaneous frequency of a locally dominant component of an input signal;
    post-processing said pre-processed data using a Kalman filter to obtain stall precursors.

2. The method of claim 1 wherein said monitoring comprises monitoring at least one of static pressure of gasses flowing through the compressor, dynamic pressure of gasses flowing through the compressor, velocity of gasses flowing through the compressor, and forces and vibrations exerted on a casing of the compressor.

3. The method of claim 2 wherein said monitoring comprises monitoring dynamic pressure at least one location within said compressor.

4. The method of claim 3 wherein said monitoring comprises monitoring dynamic pressure at a plurality of locations within said compressor.

5. A method for detecting precursors to compressor stall/surge, the method comprising:
    monitoring at least one compressor parameter to obtain raw data representative of said at least one compressor parameter, wherein said monitoring comprises sampling and digitizing signals representing said at least one compressor parameter to obtain time-series analyzed data;
    pre-processing said raw data using a frequency demodulator to produce pre-processed data, said pre-processing being at least partially performed in the digital domain;
    post-processing said pre-processed data using a Kalman filter to obtain stall precursors.

6. The method of claim 5 wherein said pre-processing comprises:
    pre-filtering time-series analyzed data obtained from said at least one compressor parameter to reject undesirable signals;
    frequency demodulating the filtered signal to produce a demodulated signal having an amplitude corresponding to the instantaneous frequency of a locally dominant component of the input signal, and
    low pass filtering the demodulated signal to reduce noise interference.

7. The method of claim 6 wherein said pre-filtering comprises band-pass filtering said time-series analyzed data, said band pass filter rejecting all signals outside a band of frequency spectrum.

8. The method of claim 7 wherein said band is centered on the tip-passage frequency of compressor blades within said compressor.

9. The method of claim 6 wherein said frequency demodulating is performed such that said locally dominant component is the tip-passage frequency of compressor blades within said compressor.

10. A method for detecting precursors to compressor stall/surge, the method comprising:
    monitoring at least one compressor parameter to obtain raw data representative of said at least one compressor parameter;
    pre-processing said raw data using a frequency demodulator to produce pre-processed data, said preprocessing being performed at least partially in the analog domain, wherein said pre-processing comprises producing a demodulated signal having an amplitude corresponding to the instantaneous frequency of a locally dominant component of an input signal; and post-processing said pre-processed data using a Kalman filter to obtain stall precursors.

11. The method of claim 10 wherein said pre-processing comprises:
pre-filtering time-series signals representing said at least one compressor parameter to reject undesirable signals;
frequency demodulating the filtered signal to produce the demodulated signal, and
low pass filtering the demodulated signal to reduce noise interference to produce preprocessed signals.

12. The method of claim 11 wherein said pre-filtering comprises band-pass filtering said time-series analyzed data, said band pass filter rejecting all signals outside a band of frequency spectrum.

13. The method of claim 12 wherein said band is centered on the tip-passage frequency of compressor blades within said compressor.

14. The method of claim 11 wherein said frequency demodulating is performed such that said locally dominant component is the tip-passage frequency of compressor blades within said compressor.

15. The method of claim 11 further comprising sampling and digitizing said preprocessed signals to produce time-series preprocessed data.

16. The method of claim 10 wherein the Kalman filter computes a filtered estimate of locally dominant components of the preprocessed data.

17. The method of claim 16 further comprising computing a standard deviation of innovations of said Kalman filter to determine a stall precursor signal.

18. The method of claim 17 further comprising comparing said stall precursor signal to a threshold.

19. The method of claim 18 further comprising controlling said compressor to take corrective action when said precursor signal exceeds said threshold.

20. The method of claim 19 wherein said corrective action is performed iteratively until the precursor signal is below said threshold.

21. The method of claim 19 wherein said corrective action comprises reducing the loading on said compressor.

22. A system for detecting precursors to compressor stall/surge comprising:
at least one sensor positioned at said compressor to monitor at least one compressor parameter, said at least one sensor outputting raw data representative of said at least one compressor parameter;
a frequency demodulator receiving said raw data, demodulating said raw data, and producing demodulated data;
a Kalman filter obtaining stall precursors from said demodulated data; and
a calibration system for sampling and digitizing output from said at least one sensor to obtain time-series analyzed raw data, said frequency demodulator receiving said time-series analyzed raw data.

23. The system of claim 22 wherein said at least one compressor parameter comprises one or more of a static pressure sensor sensing a static pressure of the gasses flowing through the compressor, a dynamic pressure sensor sensing a dynamic pressure of the gasses flowing through the compressor; a velocity sensor sensing a velocity of the gasses flowing through the compressor; and a forces and vibrations sensor sensing forces and vibrations exerted on a casing of said compressor.

24. The system of claim 22 further comprising a pre-filter to reject undesirable signals from said raw data prior to being input into said frequency demodulator.

25. The system of claim 22 wherein said demodulator operates on said raw data in the analog domain.

26. The system of claim 22 wherein said demodulator operates on said raw data in the digital domain.

27. The system of claim 22 further comprising a low-pass filter filtering the demodulated data to reduce noise interference prior to being input into the Kalman filter.

28. A system for detecting precursors to compressor stall/surge comprising:
at least one sensor positioned at said compressor to monitor at least one compressor parameter, said at least one sensor outputting raw data representative of said at least one compressor parameter;
a frequency demodulator receiving said raw data, demodulating said raw data, and producing demodulated data;
a Kalman filter obtaining stall precursors from said demodulated data; and
a stall precursor measure system computing a standard deviation of innovations of said Kalman filter to determine a stall precursor signal.

* * * * *